(12) United States Patent
Tzen (10) Patent No.: US 7,069,555 B1
(45) Date of Patent: Jun. 27, 2006

(54) SUPER-REGION INSTRUCTION SCHEDULING AND CODE GENERATION FOR MERGING IDENTICAL INSTRUCTION INTO THE READY-TO-SCHEDULE INSTRUCTION

(75) Inventor: Ten H. Tzen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 516 days.

(21) Appl. No.: 09/677,106

(22) Filed: Sep. 29, 2000

(51) Int. Cl.
*G06F 9/46* (2006.01)

(52) U.S. Cl. ..................... 718/102; 712/212
(58) Field of Classification Search ............... 709/101, 709/102, 103; 718/100–104; 712/212
See application file for complete search history.

(56) References Cited

U.S. PATENT DOCUMENTS 3,648,253 A * 3/1972 Mullery et al. ............. 709/100
5,202,993 A * 4/1993 Tarsy et al. ................. 717/152
5,430,851 A * 7/1995 Hirata et al. ................ 712/212
5,438,680 A * 8/1995 Sullivan ...................... 709/100
6,871,343 B1 * 3/2005 Yoshikawa .................. 717/161

* cited by examiner

*Primary Examiner*—Meng-Al T. An
*Assistant Examiner*—Camquy Truong
(74) *Attorney, Agent, or Firm*—Woodcock Washburn LLP (57) ABSTRACT

Systems and methods perform super-region instruction scheduling that increases the instruction level parallelism for computer programs. A compiler performs data flow analysis and memory interference analysis on the code to determine data dependencies between entities such as registers and memory locations. A region tree is constructed, where the region tree contains a single entry block and a single exit block, with potential intervening blocks representing different control flows through the region. Instructions within blocks are moved to predecessor blocks when there are no dependencies on the instruction to be moved, and when the move results in greater opportunity for instruction level parallelism. Redundant instructions from multiple paths can be merged into a single instruction during the process of scheduling. In addition, if a dependency can be removed the method transforms the instruction into an instruction that can be moved to a block having available resources.

22 Claims, 10 Drawing Sheets

SUPER-REGION INSTRUCTION SCHEDULING AND CODE GENERATION FOR MERGING IDENTICAL INSTRUCTION INTO THE READY-TO-SCHEDULE INSTRUCTION

FIELD OF THE INVENTION

This invention relates generally to programming language compilers and more particularly to region based instruction scheduling and code generation for such compilers.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright© 2000, Microsoft Corporation, All Rights Reserved.

BACKGROUND OF THE INVENTION

Since computers and computing systems were first developed, there has always been a demand for increased performance. In order to satisfy this demand, advances in both hardware and software technologies have been required. In the hardware arena, one technique used to increase performance is to provide for greater instruction level parallelism. This means that instruction sequences that were formally performed in serial fashion can now be performed at the same time, i.e. in parallel. In other words, multiple instructions are executed during a functional cycle. One method of increasing parallelism is to provide multiple functional units within a processing system. Typically, these functional units perform tasks such as memory management, integer arithmetic processing, floating point number processing and instruction branch units. Parallel processing attempts to exploit as many of the available functional units as possible during any particular moment in time.

In the software arena, compilers have been developed to take advantage of the opportunities for instruction level parallelism offered by today's hardware architectures. The compilers of previous systems have included two types of schedulers: trace-oriented and region-oriented. Trace-oriented scheduling optimizes the frequently visited path at the expense of non-frequently visited code. Trace-oriented scheduling requires an accurate weighted control flow graph (from profile feedback, static branch prediction, or user keywords) to choose the main traces, i.e. the heavy visited paths. Trace-oriented approaches have at least two drawbacks. First, developers often do not take the time or expense to profile their code. Second, some control flow has no obvious major traces.

Region-oriented scheduling, unlike trace-oriented scheduling, can work well without profile information. However when profile information is available and main traces are clearly detected, a region-oriented scheduling is not aggressive enough to optimize the code.

A further problem is that global schedulers in both trace and region schedulers of previous compilers typically schedule a single instruction at a time. Redundant instructions are typically not detected and removed. Redundant memory loads which are intercepted by ambiguous memory stores usually cannot be removed by traditional compilers due to the unpredictable runtime behavior.

Finally, the global scheduling performed by current compilers can only deal with acyclic regions. If a cycle appears in the region the region cannot be globally scheduled. Cycles can often appear due to looping constructs used in many computer programs. Thus a large subset of code cannot be optimized to achieve instruction level parallelism.

Therefore, there is a need in the art for a system that can perform effective optimization both with and without trace information.

SUMMARY OF THE INVENTION

The above-mentioned shortcomings, disadvantages and problems are addressed by the present invention, which will be understood by reading and studying the following specification.

The systems and methods presented implement various strategies for providing increased instruction level parallelism in code generated by compilers from computer program source code. In one such system, a compiler includes a front-end module operative to parse a computer program source code file into an intermediate language. A back-end module of the compiler reads the intermediate language and generates processor and operating system specific object code. The back-end module includes a global scheduler that operates to perform super-region scheduling of blocks comprising computer-executable statements. The global scheduler moves code from successor blocks to predecessor blocks having available resources such that instruction level parallelism can be increased for the block.

In one method used to perform instruction scheduling, the compiler performs data flow analysis on the code to determine instruction dependencies created by interactions between entities such as registers and memory locations. A region tree is constructed, where the region tree contains a single entry block and a single exit block, with potential intervening blocks representing different control flows through the region. Instructions within blocks are moved to predecessor blocks when there are no dependencies on the instruction to be moved, and when the move results in greater opportunity for instruction level parallelism. In addition, if a dependency can be removed by performing a transformation, the method transforms the instruction into an instruction that can be moved to a block having available resources.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into multiple sections. In the first section, definitions of certain terms used in the specification are provided. In the second section, the hardware and the operating environment in conjunction with which embodiments of the invention may be practiced are described. In the third section, a system level overview of the invention is presented. In the fourth section, methods of an exemplary embodiment of the invention are provided. Finally, in the fifth section, a conclusion of the detailed description is provided.

Definitions

This section presents definitions of terms used in the detailed description. Some of the terms are in common usage in the art, while others are specific to the invention.

Block—A block is a logical section of code that is often delimited by a jump (conditional or non-conditional) to a label.

Trace—A trace is a control path through the code with weights assigned to each block in the path indicating the relative frequency that the block is executed.

Region—A region comprises one or more blocks with a single entrance and a single exit (i.e. single head and tail blocks).

Reference Overlap—A reference overlap occurs when the memory ranges referenced by two pointer variables overlap either totally or partially.

Control Path (including both major and minor paths)—A control path is the path representing the flow of control of a program as determined by the execution of statements and the transfer of control due to branches (both conditional and non-conditional) and loop constructs. A major path is the control path most frequently followed, a minor control path is a path less frequently followed.

Hardware and Operating Environment

Figure 1:
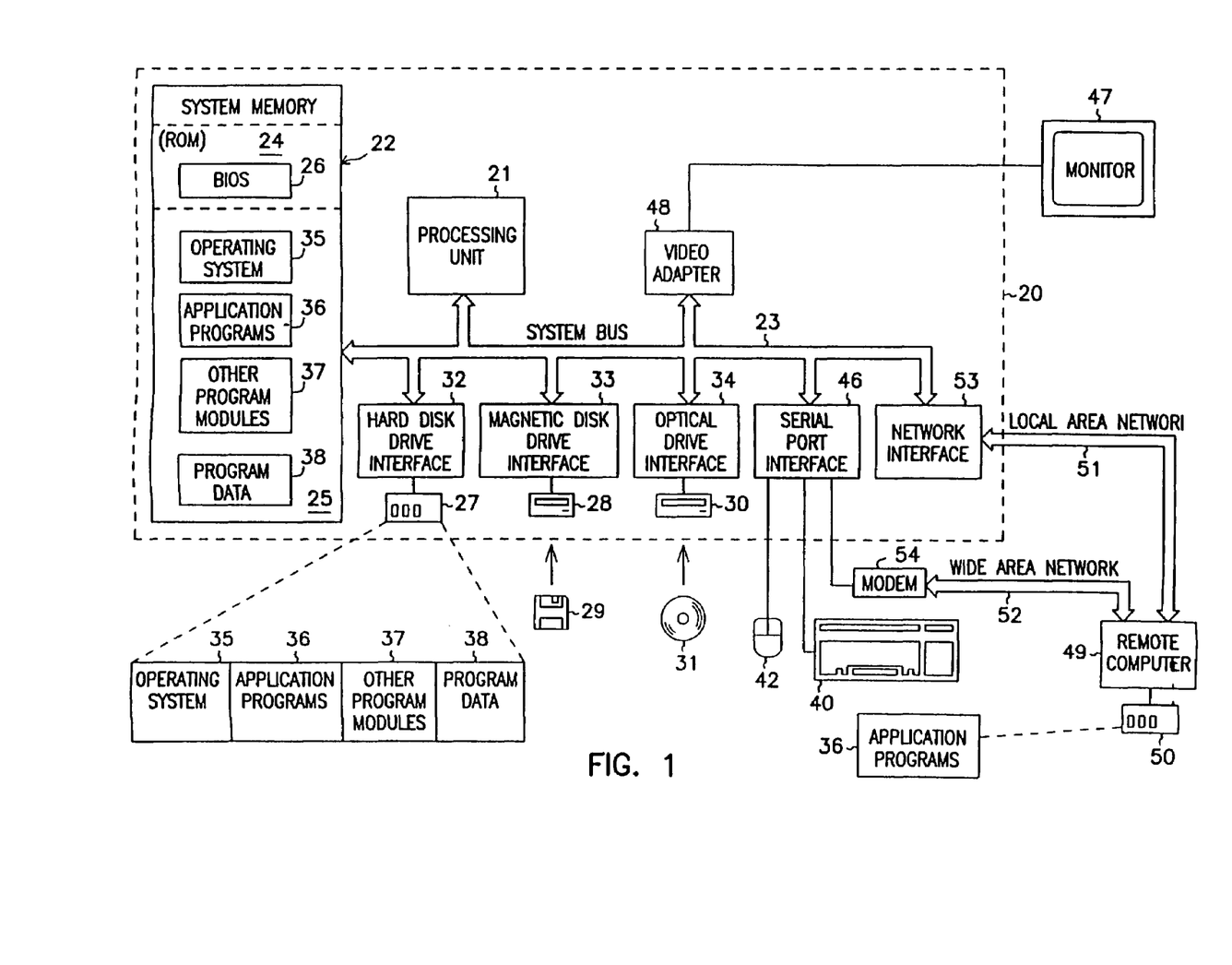
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as a remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

Figure 2:
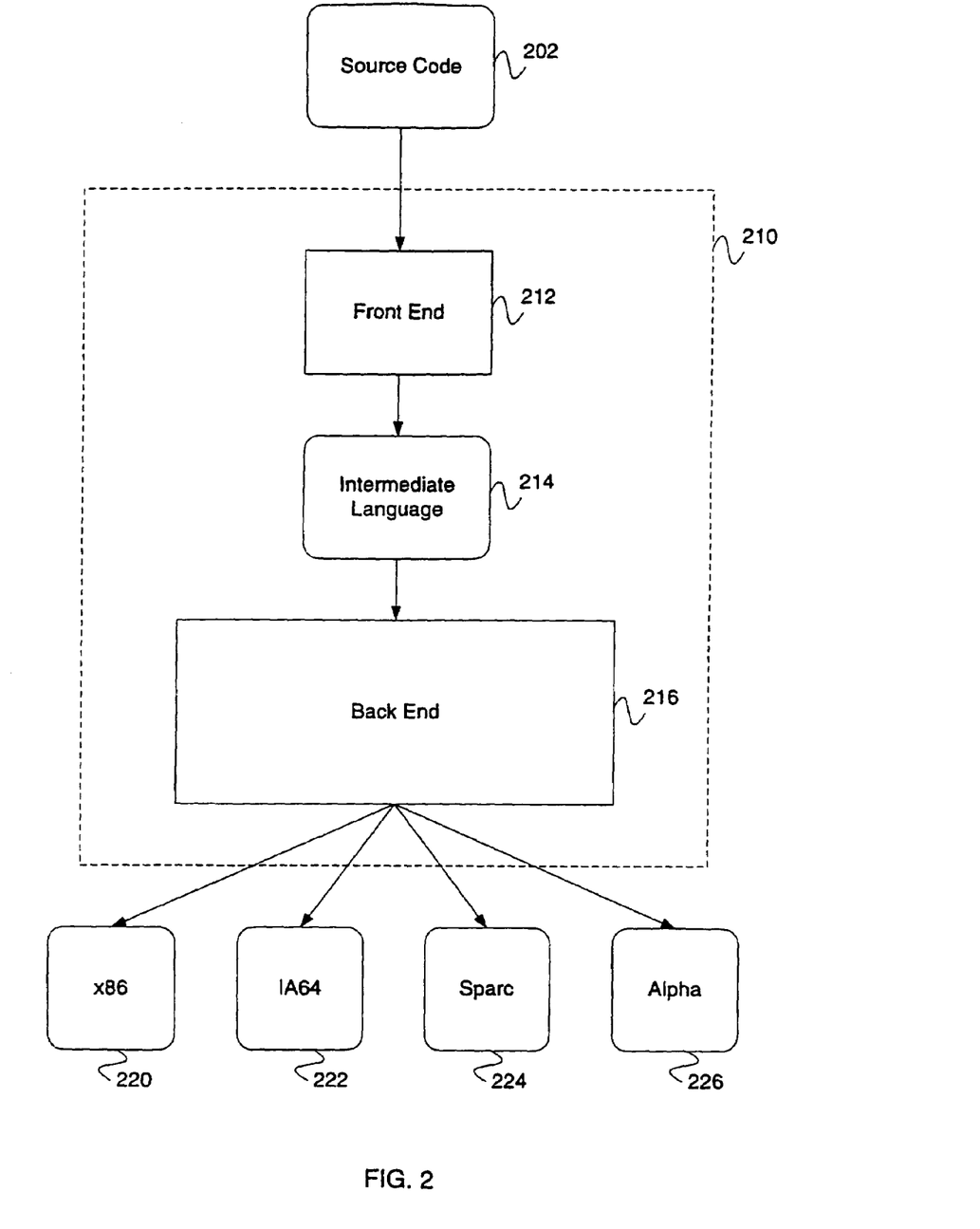
FIG. 2 is a diagram illustrating a system-level overview of exemplary embodiments of the invention.

A system level overview of the operation of an exemplary embodiment of the invention is described by reference to FIG. 2. The concepts of the invention are described as operating in a multiprocessing, multithreaded virtual memory operating environment on a computer, such as computer 20 in FIG. 1. The exemplary operating environment comprises a language compiler 210, which in one embodiment of the invention includes a front-end module 212 and a back-end module 216. Compiler 210 can be a stand-alone compiler, or it can be part of an integrated development environment.

Front-end module 212 receives as input a source code file 202. Source code file 202 is a file containing statements and expressions in a particular programming language. In one embodiment of the invention, the programming language is the C++ programming language. In an alternative embodiment of the invention, the programming language is the C programming language. The invention is not limited to any particular programming language. For example, source code file 202 can be in the Java, Ada, Pascal or other programming languages known in the art In some embodiments of the invention, front-end module 212 reads the source code file 202, performs syntax checking, and parses the statements and expressions. In some embodiments of the invention, source code file 212 is parsed by front-end module 212 into an intermediate language file 214. Intermediate language file 214 comprises a generic assembly-like language translation of the parsed source code file 202.

Back-end module 216 receives as input the intermediate language file 214, and produces object code files 220–226 for a particular processor and operating system. For example, if the program is intended to run on the Pentium processor from Intel Corporation, then the back-end module 216 will produce x86 object code file 220. If the program is intended to run on the IA64 processor from Intel Corporation, then an IA64 object file 222 will be produced. Other potential output files include object code for Sparc object file 224 for the Sparc processor from Sun Microsystems, and Alpha object file 226 for the Alpha processor from Compaq Computer Corporation. As those of skill in the art will appreciate, object code for other processors can be produced and is within the scope of the invention. Back-end module 216 thus converts the generic assembly language statements in intermediate file 214 to processor specific assembly language and object code.

In addition, back-end module 216 performs various optimizations designed to increase the performance of the executable code in object code files 220–226. In general terms, the optimizations include analyzing the code and creating regions of code that can be scheduled in such a manner as to maximize the parallel processing capability of the particular processor. Details on the methods used to perform these optimizations are presented in the next section.

As indicated by the dashed lines for compiler 210, front end module 212 and back end module 216 can be modules of the same program, they can be separate programs that are part of a package, or they can be separate programs that reside on different computing systems. In one example of the latter environment, the front end module receives and processes the source code on one system to produce the intermediate language file 214, which can then be distributed to other systems for processing by backend module 216. The invention is not limited to any particular system distribution model for front end 212 and back end 216.

Methods of an Exemplary Embodiment of the Invention

In the previous section, a system level overview of the operation of an exemplary embodiment of the invention was described. In this section, the particular methods of the invention performed by an operating environment executing an exemplary embodiment are described by reference to a series of flowcharts and diagrams shown in FIGS. 3–8. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from computer-readable media). The methods illustrated in FIGS. 3–8 are inclusive of the acts required to be taken by an operating environment executing an exemplary embodiment of the invention.

Figure 3:
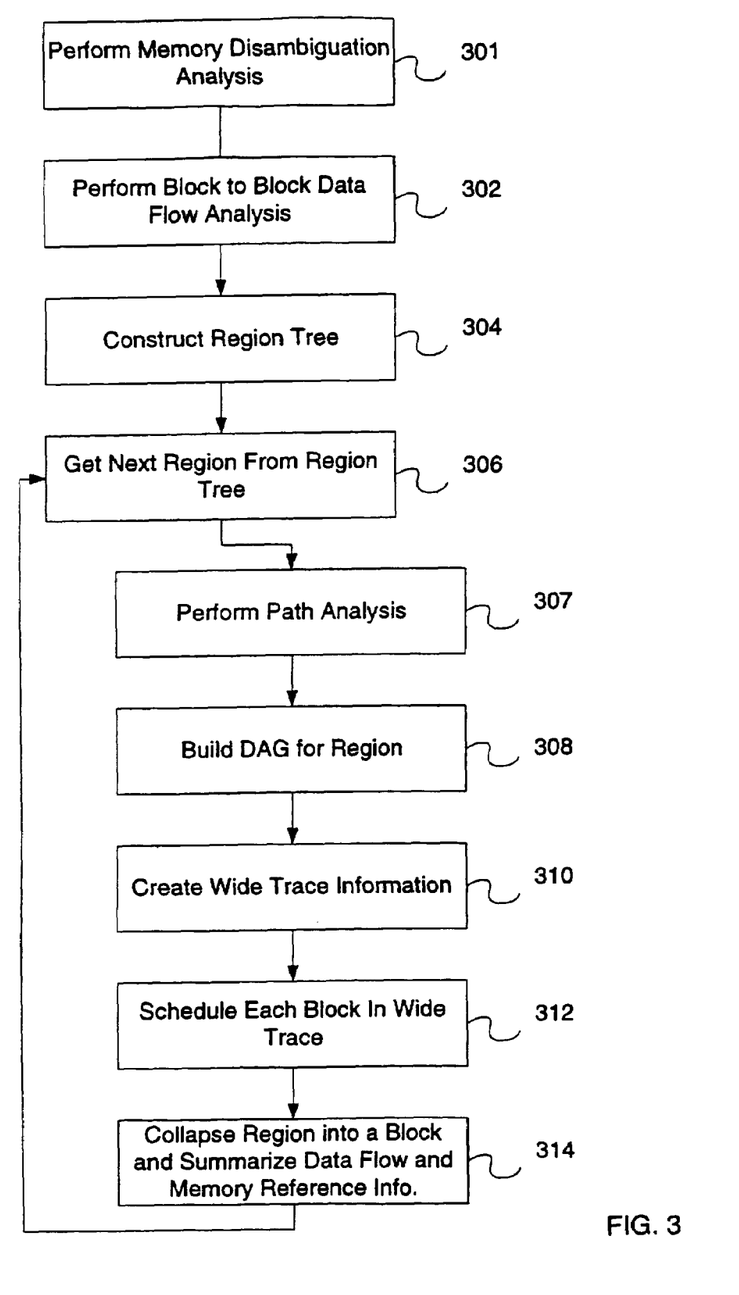
FIG. 3 is a flow diagram illustrating methods implementing various compiler optimization strategies according to exemplary embodiments of the invention.

In FIG. 3, an overview of a method for optimizing generated code execution by implementing a super region scheduling strategy according to one embodiment of the invention is shown. The method begins when a system executing the method, such as compiler 210, performs memory disambiguation analysis (block 301). Memory disambiguation analysis comprises analyzing each instruction in order to determine if a memory reference in one instruction refers to memory that is referenced in another instruction. The references can be fully or partially overlapping references. References that potentially overlap are noted, and information about the overlap is associated and stored with the instruction.

Next, the system performs a block-to-block data flow analysis of a section of code (block 302). The first step of data flow analysis is to build the control flow graph of the entire function. In one embodiment of the invention, the control flow graph is composed of a set of basic blocks connected by directed edges. The data flow analysis determines the register usage through the generated control flow graph. The register "liveness" information, which includes "live-in" and "live-out", of each block is stored in the control flow graph. A register is "live-in" with respect to a current block if it is a live register containing data that was set in a previous block. A register is "live-out" with respect to a current block if the register is set to a data value that is used in a subsequent block. The edges of control flow graph are annotated to indicate live-in and live-out registers. For example, consider the assembly language sequence below (assuming Block-1 reaches Block-2):

Block-1:
  r2=r3+r4
  r3=r2+1

Block-2:
  r5=r2+r3

The live-in of Block-1 is r3 and r4 that are defined in some previous blocks (not shown in this sequence). Element r2 and r3 are said to live-out of Block-1 because they are used in Block-2. Similarly, r2 and r3 are said to be live-in of Block-2 because they are defined in Block-1 and referenced in Block-2.

It will be appreciated by those of skill in the art that it is not important which order blocks 301 and 302 are processed. While FIG. 3 shows block 301 being executed first, alternative embodiments of the invention execute block 302 before or in parallel to block 301.

Next, a compiler executing the method creates a region tree (block 304). The region tree is a tree graph describing the relationships of regions formed from the control flow graph created at block 302. The control flow graph is analyzed to determine sub-graphs that meet the criteria for defining a region. A region comprises a control flow sub-graph with a single entry block that dominates all of the blocks in the region. The region can be either cyclic or acyclic. A region also has a single exit block that post-dominates each block in the region. Unlike previous systems, regions can be within a parent region, and in addition, regions can contain child regions. Thus a super-region comprises and contains other regions.

Figure 4A:
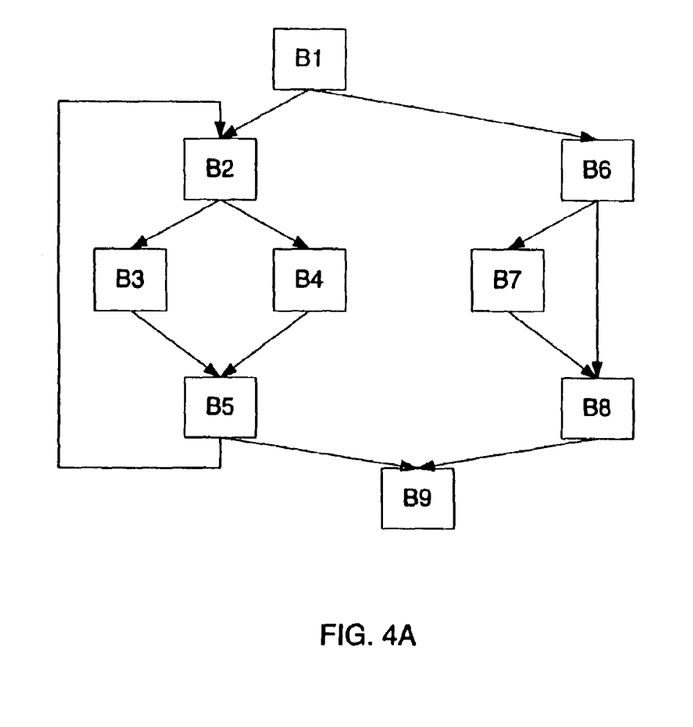
FIGS. 4A and 4B illustrate the construction of regions from a control flow graph according to an exemplary embodiment of the invention.
Figure 4B:
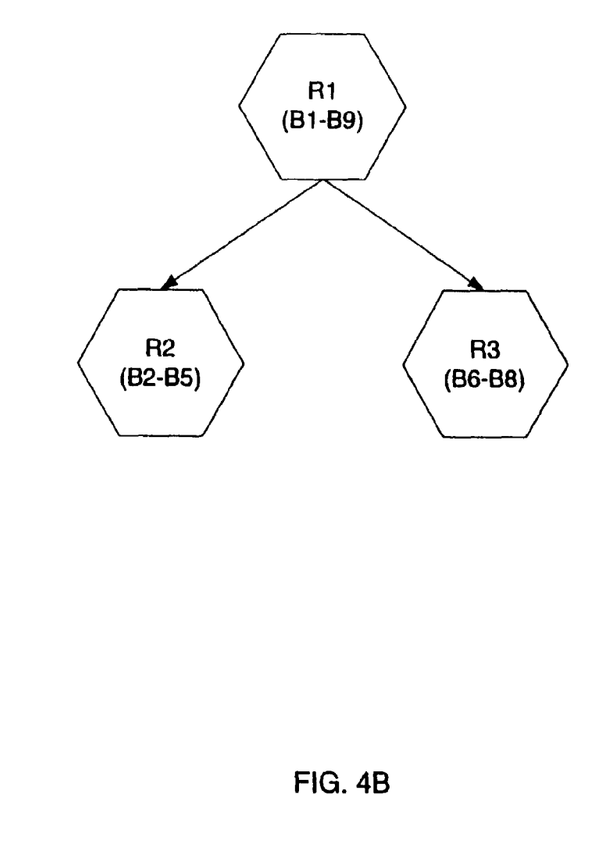

FIGS. 4A and 4B provide a graphical illustration of an exemplary control flow graph and an exemplary region graph created from the exemplary control flow graph. In FIG. 4A, blocks in the control flow graph are represented as rectangles labeled B1–B9. As noted, the blocks represent the flow of control through the code generated by the compiler. Thus block B1 contains instructions, the last of which is a conditional causing execution to proceed to either block B2 or B6. In FIG. 4B, the regions created from the control flow graph in FIG. 4A are labeled R1–R3. The blocks comprising the region are indicated in parenthesis. In the exemplary embodiment shown, four blocks are included in region R2. In one embodiment of the invention, regions are limited to a maximum of sixty-four blocks. Limiting the number of blocks is desirable because it can decrease the amount of time required to compile the source code. However, the invention is not limited to any particular block size or number of blocks per region.

After the region tree is created, each region in the tree graph is processed. Block 306 is the top of a loop that traverses the region tree and gets the next unprocessed region. In one embodiment of the invention, the graph is traversed starting from the innermost region and proceeding to the outermost region. Thus a region is processed after all its child regions are processed. In the example illustrated above in FIG. 4B, region R2 will be processed first, then region R3. Finally region R1 is processed.

Next, the method performs a path analysis for the region (block 307). The path analysis computes the path information from one block to another block. The path information collected in the phase includes (1) middle blocks, (2) side exits and (3) side entrances. In one embodiment of the invention, the middle blocks are the set of blocks the source block need to traverse to reach the destination block. A side exit is an edge that flows out from a middle block into a block that is not a middle block. Similarly a side entrance is an edge flows into a middle block from a block which is not a middle block. The path information is collected for every pair of blocks in a region. Since a region is a single entry and single exit sub-graph, middle blocks, side exits and side entrances should all locate in the same region. Note that for those blocks that are not connected by forward edges, the path information is null.

The method then computes data dependencies between instructions to create a Directed Acyclic Graph (DAG) for every block in the region (block 308). An instruction A is said to read-after-write-depend on another instruction B if the data used by instruction A is defined by instruction B. For example, consider the assembly language sequence below:

r2=r3+r4 (1)

[r5]=r2 (2) //Store r2 into the memory addressed by r5 r4=[r2] (3) //Load the content of memory addressed by r2 into r4

Instruction (2) is read-after-write-depend on instruction (1) due to r2. The dependency can also be caused by memory references. For example instruction (3) is read-after-write-memory-depend on instruction (2) if it is possible that [r2] and [r5] could totally or partially overlapped. Whether or not two memory references overlapped is determined by the memory disambiguation information provided by block 301. Note that the concept of dependency also includes both write-after-write and write-after-read dependence. Every instruction corresponds to a "node" while dependency is represented by a directed "edge" in the DAG.

Starting from the tail block of the region, DAGs are built by following a bottom-up traversal manner. Thus, the DAG of a block will not be built until the DAGs of all its successor blocks are built. For example, consider the exemplary region shown in FIG. 8. The DAG of block 804 will be built first, then block 802, 803 and 801.

The DAG for each block comprises local and remote instructions that are connected by directed data dependency edges. Local instructions are those instructions in the block currently being processed. Remote instructions are those ready instructions that exist in a successor blocks to the current block. A ready instruction is an instruction that is ready to be scheduled, i.e. it is not dependent on any instruction, or its dependence can be removed by one or more transformations applied to the instruction. Consider block 802 in the region in FIG. 8. Instructions d, e, and f are local instructions, while instructions a and b are remote instructions from block 801. Note that to be a remote instruction of a predecessor block, one must be a ready instruction with respect to its home block. For example, instructions a and b are ready in block 804 so they can be promoted to blocks 802 and 803.

Figure 8:
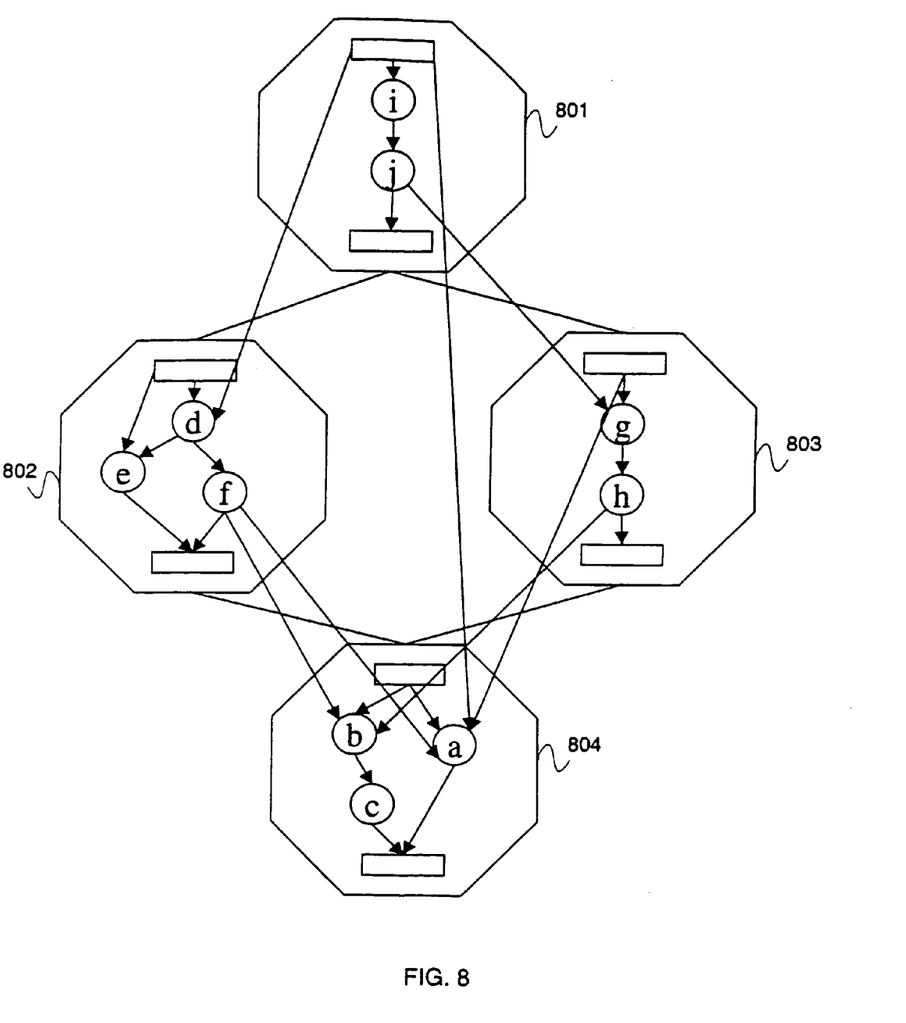
FIG. 8 illustrates an exemplary regional DAG (Directed Acyclic Graph) according to embodiments of the invention.

Remote instructions in successor blocks are analyzed to determine if they are data-dependent on instructions in the current block. If the remote instruction is not data-dependent on any instruction in the current block, it can be continuously promoted from the successor block to the predecessor block. For example, instruction a in block 804 is not dependent on any instruction in block 803, so it's also a remote instruction of block 801. Whether or not an instruction is promoted depends in part on whether the move cause a conflict with a live-out register of any side exit edge (i.e. whether the move would render the register value ambiguous in a successor block depending on the control path that is executed). For example, to make instruction d a remote instruction of block 801, we must check for a live-out register of the side exit from the path of block 802 to block 801. (In this case, we have only one side exit, the edge from block 801 to block 803). The side exit information is provided by path analysis (FIG. 3, block 307). The register live-out information is initially computed by data-flow analysis (FIG. 3, block 302) and is incrementally updated whenever an instruction is moved from a block to another block. In some embodiments of the invention, the edges of the DAG can be annotated. The annotations comprise the transformations required to remove or break dependencies on other instructions.

Figure 5A:
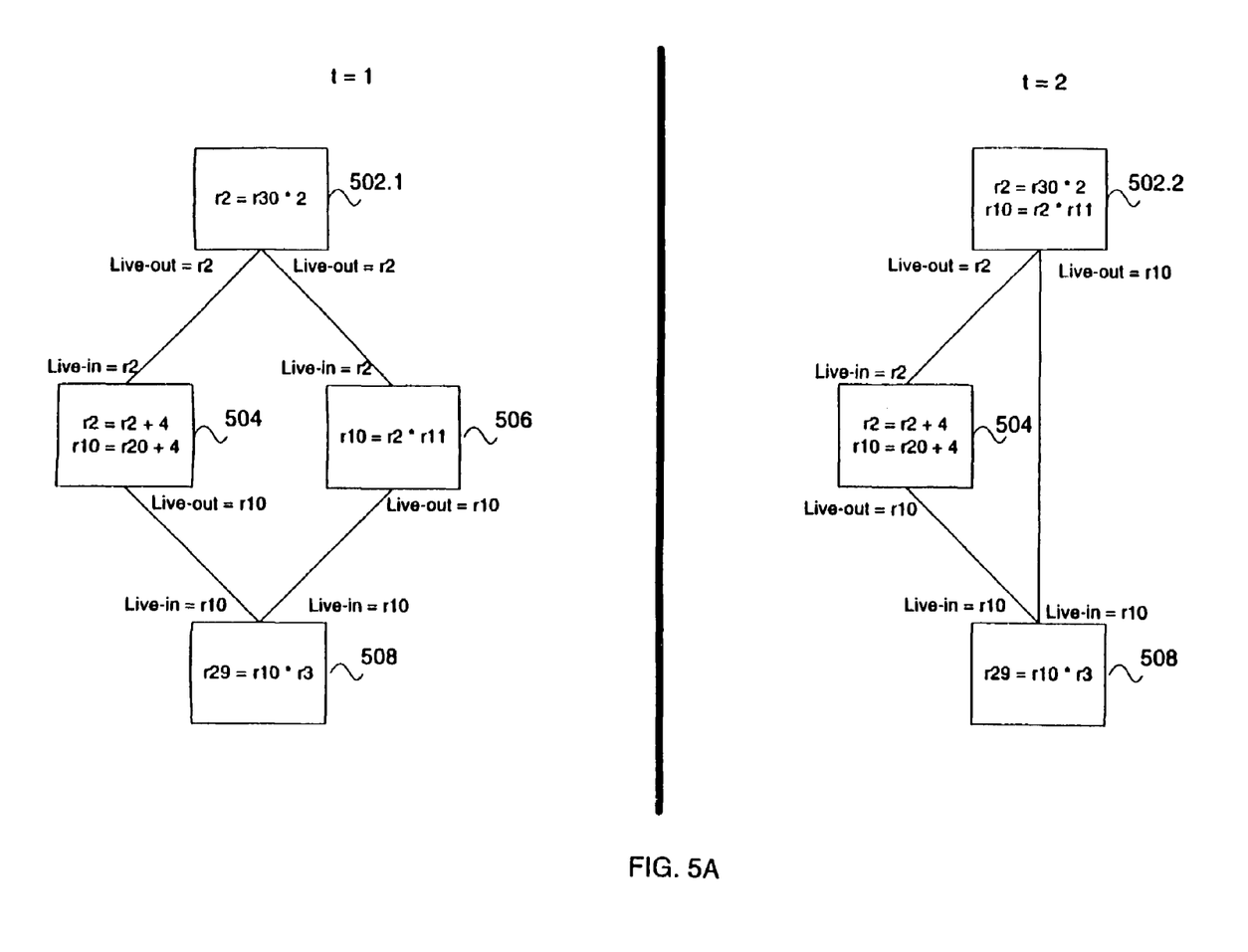
FIG. 5A illustrates exemplary before and after DAGs constructed according to an embodiment of the invention.

Exemplary before and after DAGs illustrating the above is shown in FIG. 5A. At time t=1, DAG 500 comprises instruction blocks 502.1, 504, 506, and 508. Each block comprises at least one instruction. In the exemplary DAG 500, the instruction in instruction block 506 has been identified for promotion to instruction block 502. This can be accomplished because the promotion does not "kill" any live-out registers of the side exit edge from block 502 to block 504, in this case r2. Exemplary DAG 550 illustrates results of the move. As shown, instruction block 506 is no longer needed, as instruction block 502.2 now contains the instruction formerly in instruction block 506.

Returning to FIG. 3, in some embodiments of the invention, Wide-Trace (WT) information is created (block 310). A wide-trace is a control-flow sub-graph that can have multiple entrances and exits. A wide-trace has at least one entrance, the top entrance, that can reach each node in the wide-trace. The wide-trace can comprise a subset of one or more blocks in the current region, or it can comprise all of the blocks in the region. The determination of which blocks in the region to include in the wide-trace is dependent on the weight of the directed edges in the control flow graph. The weights can be determined by profiling executing code, or it can be determined by prediction heuristics. Blocks in the major traces (i.e. the most commonly executed control path) are chosen for inclusion in the wide-trace. These blocks are then selected for more aggressive optimization on the assumption that aggressive optimization of highly visited blocks is worth the extra cost of aggressive optimization. In some embodiments of the invention, multiple wide-traces can be determined, and then ordered by frequency or weight. The wide-traces in a region are then processed in order, with the most frequently used wide-trace processed first. If no profiling information is available, or if no heuristics are available, then the whole region can be considered a single wide-trace.

Figure 5B:
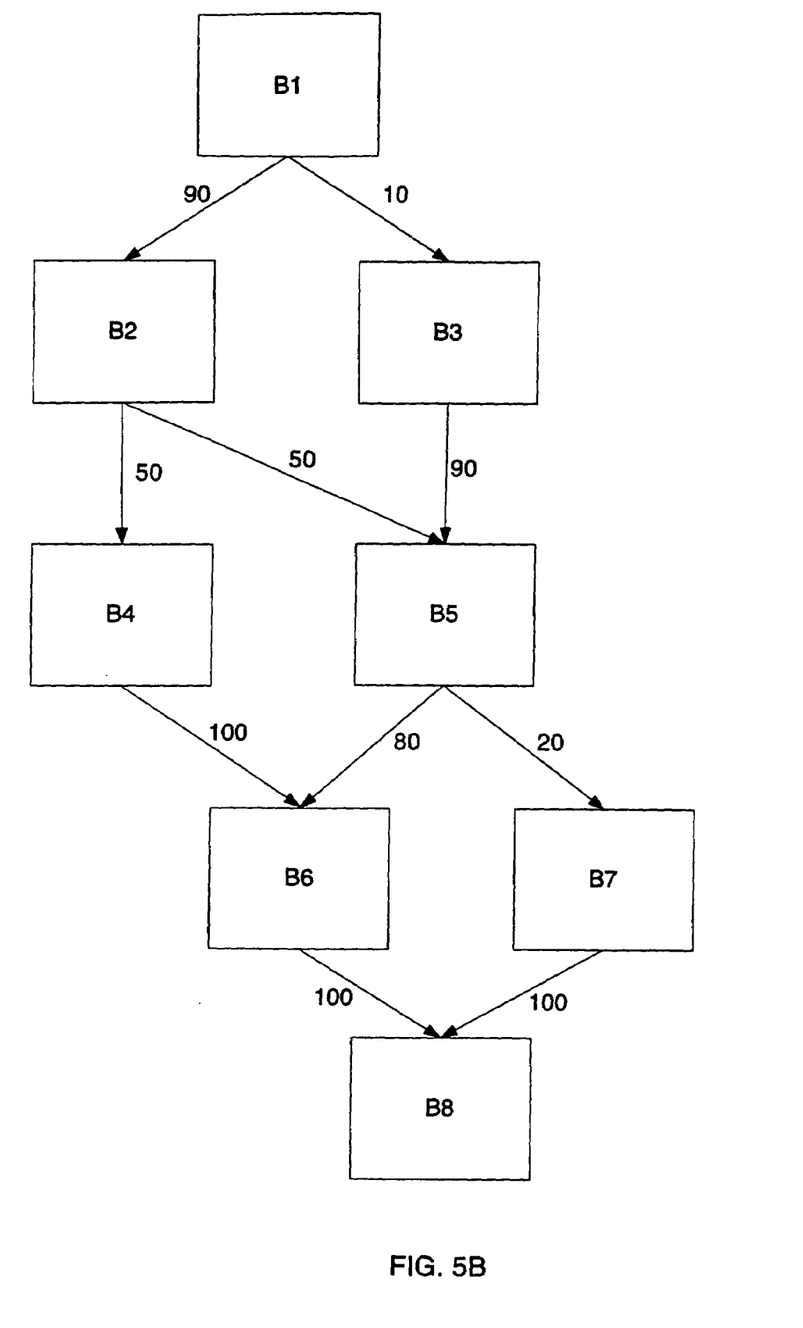
FIG. 5B illustrates an exemplary wide-trace constructed according to embodiments of the invention.

An exemplary graph illustrating a wide-trace is shown in FIG. 5B. In the graph, rectangular blocks represent instruction blocks within a region. The edges connecting the node blocks are labeled with their frequency as determined by profiling. In the example shown, the first major wide-trace comprising blocks B1, B2, B4, B5, B6 and B8 is formed. The remaining blocks, B3 and B7, form the second and third wide-trace respectively.

Figure 6:
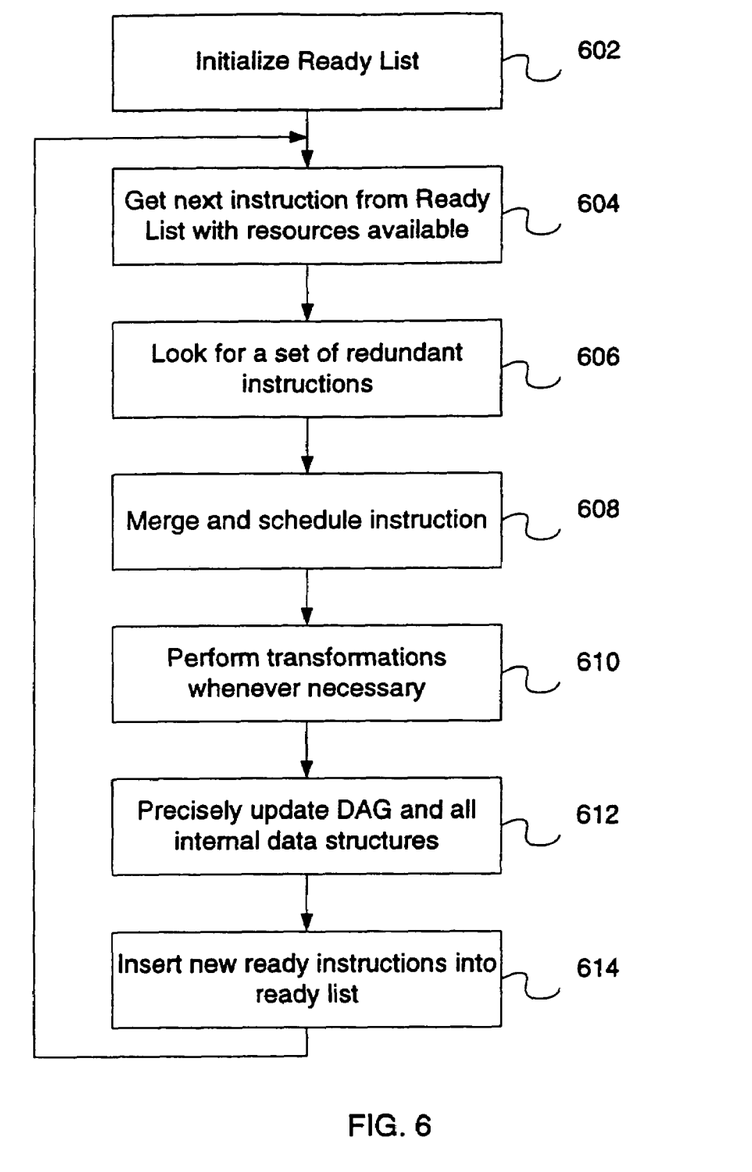
FIG. 6 is a flow diagram providing further details on scheduling instructions according to embodiments of the invention.

Returning to FIG. 3, after the one or more wide-traces have been formed, each block in the wide-trace is scheduled (block 312). Further details on a method 600 for scheduling of blocks are illustrated in FIG. 6. Block scheduling begins when a ready list is initialized (block 602). The ready list comprises the set of instructions that are ready to be scheduled. Such lists are known in the art. In some embodiments of the invention, the ready list is sorted based on the priority that is computed by a set of heuristics.

Next, scheduling proceeds by looking into the ready list and selecting the next available instructions for which resources can be allocated in the current instruction cycle (block 604). In one embodiment of the invention, processing resources include integer math 110 unit, memory access unit, floating point processing unit, and a branch unit. A table is maintained, and as an instruction uses a resource, it is marked as no longer available in the table. Table 1 below illustrates an exemplary table according to an embodiment of the invention.

TABLE 1

| Int. 0 | Int. 1 | Mem0 | Mem1 | FP0 | FP1 | Br0 | Br1 | Br2 |
|--------|--------|------|------|-----|-----|-----|-----|-----|
| 1      | 1      |      |      |     |     | 1   | 1   |     |

In the exemplary table, Integer unit 1, memory unit 1, floating point units 0 and 1, and branch unit 2 can have resources allocated. The other units have been scheduled for use by other instructions.

The ready list is scanned for a set of identical, or redundant operations (block 606). In one embodiment of the invention, the identity of instructions is implemented by a hashing 20 mechanism. However, the invention is not limited to hashing mechanisms, and in alternative embodiments of the invention a search mechanism is used. Those of skill in the art will appreciate that alternative mechanisms for locating identical or redundant operations are possible and within the scope of the invention.

Then the set of redundant instructions are merged into a single instruction that is scheduled (block 608). The redundant operations are removed, and the single instance is scheduled to occur at or before the first instance of the instruction. It is possible that redundancy is not found and only one instruction is selected. Also note that not every instruction in the ready list can be chosen at any moment. Only those instructions for which functional resources are available are scheduled.

In some cases, it is possible to break or remove a dependency by performing a transformation of an instruction (block 610). In one embodiment of the invention, the transformations include control speculation, data speculation, compensation code, renaming and predication. Not all processor architectures support all of the above transformations, the varying embodiments of the invention can take advantage of whatever mechanisms for transformation are available. In control and data speculation (an example of which can be found in the Intel IA64 architecture), the scheduler replaces an absolute data load instruction with a speculative version of the instruction followed by a check instruction. The speculative version of the instruction is generated for the most likely or commonly occurring control flow, and the check instruction is scheduled in a manner to insure that the correct code is executed regardless of the speculation. If the speculation is correct, the check code consumes no cycles. If the speculation is incorrect, the check instruction causes recovery code to be executed that is the correct branch or data load that should have occurred had the speculation been correct.

Compensation code is needed if an instruction is moved across side entrances. Side entrance information is computed by path analysis in block 307 (FIG. 3). For example, the code motion in FIGS. 7A and 7B has one side entrance block 710. A replicated instruction is made and put into block 710.2 as shown in FIG. 7B.

In predication, a predicate register is specified in the instruction. If the value of the predicate register represents a "true" value, the instruction is executed. Otherwise, the instruction is not executed. An implementation of predication can be seen in Intel IA64 Architecture. Predication can be used to resolve the side exit live-out conflict. For example, consider the region in FIG. 5A at t=2. The second instruction of block 504 "r10=r20+4" cannot be moved to block 502.2 because it has a side exit live-out conflict, in this case r10. However if we guard this instruction with a predicate that is true only when the control is flowing from block 502.2 to block 504, this code motion can be made legally.

Renaming occurs when an instruction is identical but for the definition of a different register. When possible, the register is renamed to match the ready instruction, thereby creating an identical instruction that can be merged. Later occurring dependent uses of the register must also be renamed in order to insure correct operation. Also similar to predication, renaming can be applied to get around a side exit live-out conflict.

After applying transformation, the system proceeds to resolve the dependencies of scheduled instructions and update the data structures representing the system state, including updating the DAG to reflect the movement of instructions to higher blocks and the transformation of instructions (block 612). As will be appreciated by those of skill in the art, the movement and transformation of instructions as described above can result in changes to the live-in and live-out status of registers, and in addition, elimination of empty blocks. The updates to the DAG reflect these changes. Thus, unlike previous systems, there is an incremental update of state as instructions are processed.

The update typically exposes other opportunities for instruction level parallelism, and results in more ready instructions. These new instructions are then placed on the ready list (block 614). The method then proceeds back to block 604 to retrieve the next instruction from the ready list and the process is repeated until all instructions are scheduled.

Figure 7A:
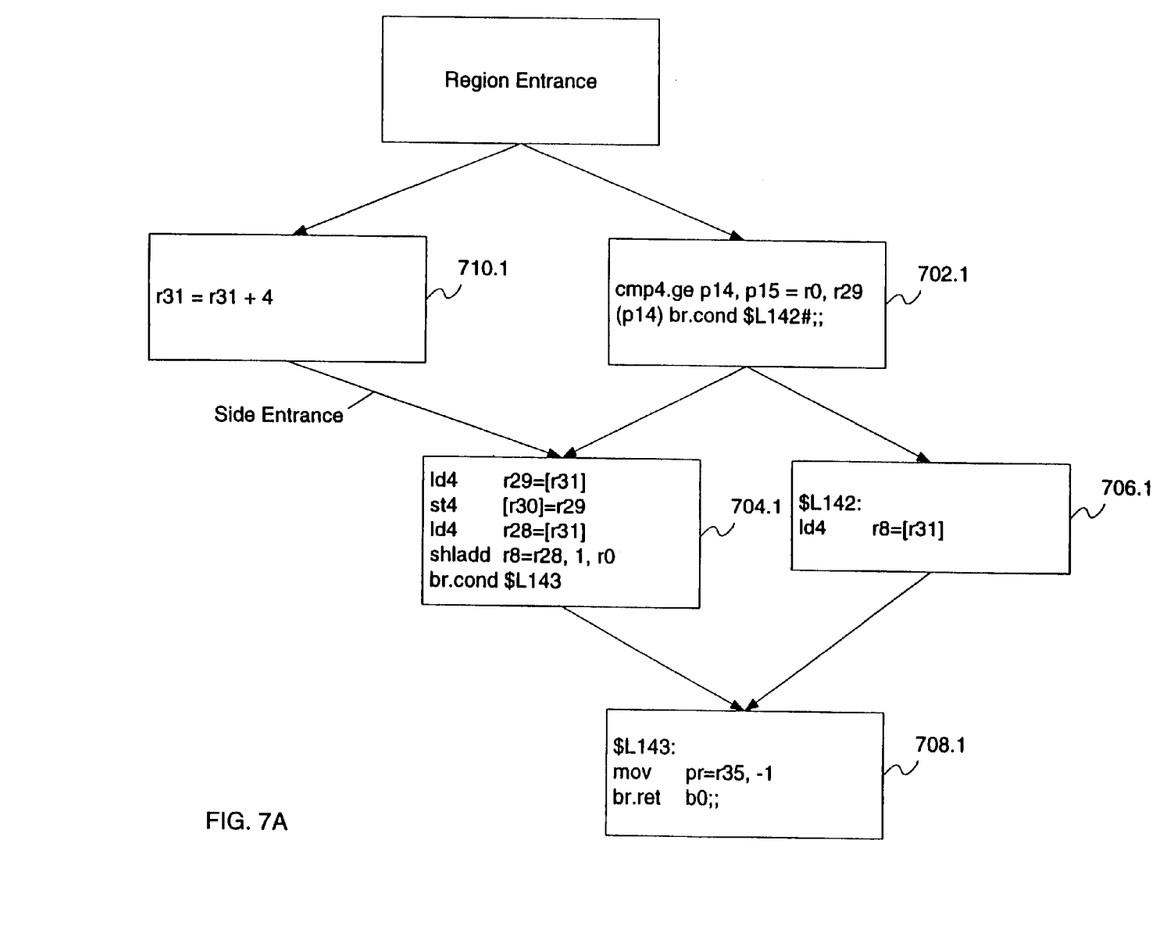
FIGS. 7A and 7B provide illustrations of exemplary code blocks before and after the operation of the methods of various embodiments of the invention.
Figure 7B:
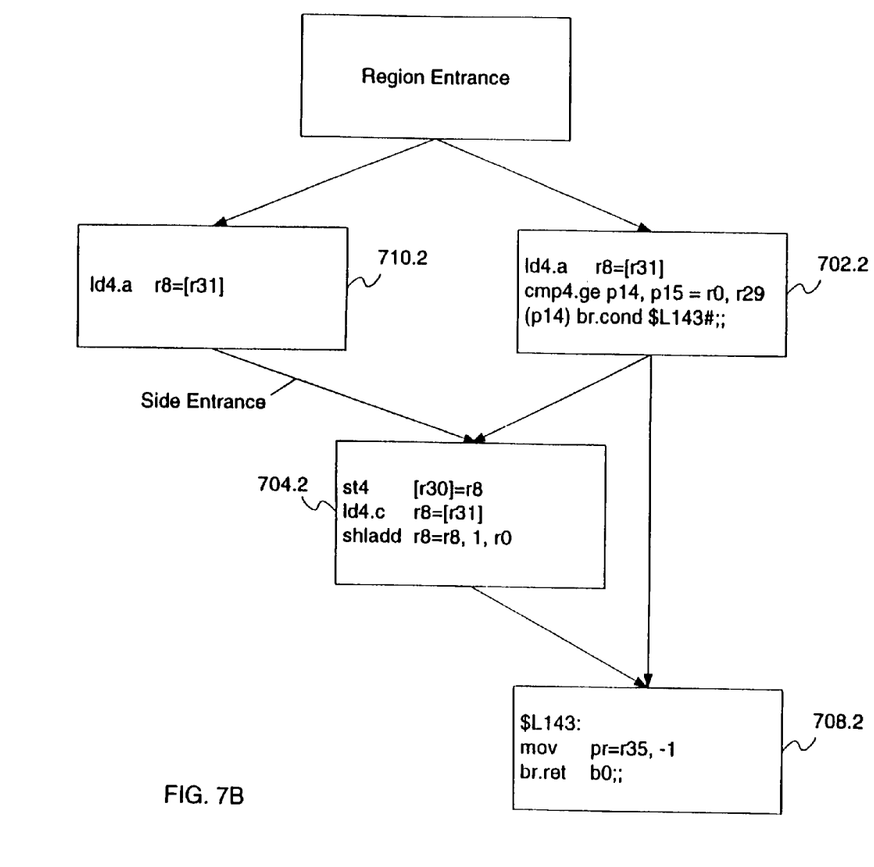

An exemplary before and after representation of a region containing blocks of code is presented in FIGS. 7A and 7B. FIG. 7A illustrates a region as it exists prior to the application of the systems and methods of embodiments of the invention. In the exemplary representation, block 702.1 comprises code performing a comparison followed by a conditional branch. Blocks 704.1 and 706.1 are alternative blocks of code that are executed depending on the results of the comparison in block 702.1. Block 708.1 is a block of code performing a return out of the function. In addition, FIG. 7A illustrates a side entrance. Block 710.1 is a side entrance to the path from block 704.1 to block 702.1.

FIG. 7B illustrates the code after the systems and methods of the invention have been applied to the blocks in FIG. 7A. The application of the method described above results in several transformations. For example, instances of register 28 and 29 in block 704.1 have been renamed to register 8 in 704.2 in order to provide identity among the instructions. The instructions are then merged into a single load instruction. The single load instruction can then be promoted to block 702.2 as a speculative load instruction. Promotion of the instruction results in the elimination of block 706.1 entirely, thereby allowing the removal of the branch around block 706.1 from 704.2. In order to ensure that the speculative load executes properly, a corresponding speculative load check (ld.c) is generated in block 704.2. As can be seen, there are fewer instructions to execute in total, and there are increased opportunities for instruction level parallelism in block 702.2 as a result of the operations.

Because of the existence of the side entrance by instruction block 710, rename compensation must be performed. Here, the moved instruction is moved both to instruction blocks 702.2 and 710.2. This is done to ensure that the register 8 is loaded with the appropriate value prior to the execution of code in block 704.2. This is an example of speculative partial redundancy elimination (PRE). Those of skill in the art will appreciate that speculative common sub-expression elimination (CSE) can also be performed.

Returning to FIG. 3, after each block in a region has been processed, the entire region is collapsed into a pseudo block of the parent region (block 314). This pseudo block includes one single pseudo instruction with the summary information of this collapsed region. The summary information includes register usage and memory references. From the parent region's perspective, this is a regular block including a regular instruction that reads and updates many registers and memory locations.

CONCLUSION

Systems and methods for using super regions for scheduling instructions that provide for high levels of instruction level parallelism have been described. Regions are created which can be contained by parent regions, and which can contain child regions. Instructions in blocks within the regions can be moved to blocks that have functional resources available such that instruction level parallelism can be taken advantage of. In certain cases, instructions can be transformed so that they can be moved to blocks have functional resources available. After each move or transformation, the state of the system, including register liveness of blocks, DAGs and annotated edges are updated to reflect the current state.

The embodiments of the invention provide many advantages not found in prior systems. For example, annotating the edges with required transformations allows the system to determine the cost of a code motion and provides greater opportunity for moving instructions that are blocked by control or data dependency. This allows the embodiments of the invention to discover opportunities for instruction level parallelism that can be exploited along both major and minor control paths. In addition, in some embodiments of the invention, redundant instructions are automatically detected and eliminated from every control flow during the scheduling process. Furthermore, redundant memory loads that are intercepted by ambiguous stores are detected and eliminated by using the data speculation mechanism provided by IA64-like architectures. Also, code motions that need transformations are executed only when it's necessary and profitable. That is, transformations only take place, and code is only moved if there are blocks with resources available that would increase the level of instruction level parallelism. Moreover, instructions can be moved across a loop or moved into a loop if it's profitable. All that is desirable is that the block the instruction is being moved to provide further opportunities for instruction level parallelism than the block the instruction is moved from. Finally, the state of the system is incrementally updated. Incremental updates provide greater freedom move instructions, and to determine the impact of moving instructions.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, while the embodiments of the invention have been described as executing within a compiler for programming language source code, any environment in which activities are to be performed in parallel can be adapted to use the systems and methods described above.

As a further example, references to registers have been used to illustrate the systems and methods of the invention. However, the same principles can be applied to other data storage mechanisms such as memory.

The terminology used in this application is meant to include all of these environments. Therefore, it is manifestly intended that this invention be limited only by the following claims and equivalents thereof.

What is claimed is:

1. A computerized method for scheduling one or more instructions within one or more instruction blocks, the method comprising:
    analyzing a control flow and a data flow of the one or more instructions to determine registers accessed by the one or more instructions;
    constructing a region tree having one or more regions, each region containing a subset of the one or more instruction blocks; and,
    for each region in the region tree, performing the tasks of:
        creating a dependency graph of the subset of the one or more instruction blocks based on the registers accessed by the one or more instructions comprised in the subset of the one or more instruction blocks; and,
    scheduling each block in the subset of the one or more instruction blocks, wherein scheduling each block in the subset of the one or more instruction blocks comprises:
    constructing a ready list for holding ready-to-schedule instructions; obtaining a ready-to-schedule instruction from the ready list;
    scanning the ready list for one or more identical instructions to the ready-to-schedule instruction; and
        merging the one or more identical instructions into the ready-to-schedule instruction.

2. The computerized method of claim 1, wherein creating a dependency graph creates a directed acyclic graph.

3. The computerized method of claim 1, wherein the tasks performed further include creating a wide-trace within the region, the wide-trace comprising a second subset of the blocks in the region, each block in the subset having a block weighting representing frequency of use of the block.

4. The computerized method of claim 3, wherein the block weighting is determined by profiling the one or more instructions.

5. The computerized method of claim 3, wherein the block weighting is determined by heuristics designed to predict the block weighting.

6. The computerized method of claim 1, wherein scheduling each block in the subset of the one or more instruction blocks further comprises transforming an instruction into an identical instruction.

7. The computerized method of claim 6, wherein transforming an instruction comprises transforming the instruction into a speculatively executed instruction.

8. The computerized method of claim 6, wherein transforming an instruction comprises changing the register accessed by the instruction.

9. The computerized method of claim 6, wherein transforming an instruction comprises converting the instruction into a predicate instruction.

10. The computerized method of claim 1, further comprising analyzing a set of memory references for a memory interference.

11. The computerized method of claim 1, wherein the tasks further include:
    performing a path analysis for use in creating the dependency graph; and
    incrementally updating a system state.

12. A computer-readable storage medium having computer-executable instruction for performing a method for scheduling one or more instructions within one or more instruction blocks, the method comprising:
    analyzing a control flow and a data flow of the one or more instructions determine registers accessed by the one or more instructions; constructing a region tree having one or more regions, each region containing a subset of the one or more instruction blocks; and, for each region in the region tree, performing the tasks of:

creating a dependency graph of the subset of the one or more instruction blocks based on the registers accessed by the one or more instructions comprised in the subset of the one or more instruction blocks; and, scheduling each block in the subset of the one or more instruction blocks, wherein scheduling each block in the subset of the one or more instruction blocks comprises:

constructing a ready list for holding ready-to-schedule instructions; obtaining a ready-to-schedule instruction from the ready list;

scanning the ready list for one or more identical instructions to the ready-to-schedule instruction; and merging the one or more identical instructions into the ready-to-schedule instruction.

13. The computer-readable medium of claim 12, wherein creating a dependency graph creates a directed acyclic graph.

14. The computer-readable medium of claim 12, wherein the tasks performed further include creating a wide-trace within the region, the wide-trace comprising a second subset of the blocks in the region, each block in the subset having a block weighting representing frequency of use of the block.

15. The computer-readable medium of claim 14, wherein the block weighting is determined by profiling the one or more instructions.

16. The computer-readable medium of claim 14, wherein the block weighting is determined by heuristics designed to predict the block weighting.

17. The computer-readable medium of claim 12, wherein scheduling each block in the subset of the one or more instruction blocks further comprises transforming an instruction into an identical instruction.

18. The computer-readable medium of claim 17, wherein transforming an instruction comprises transforming the instruction into a speculatively executed instruction.

19. The computer-readable medium of claim 17, wherein transforming an instruction comprises changing the register in the instruction.

20. The computer-readable medium of claim 17, wherein transforming an instruction comprises converting the instruction into a predicate instruction.

21. The computer-readable medium of claim 12, wherein the method further comprises analyzing a set of memory references for a memory interference.

22. The computer-readable medium of claim 12, wherein the tasks further include performing a path analysis for use in creating the dependency graph.

* * * * *